(12) United States Patent
Ko et al.

(10) Patent No.: US 7,301,692 B2
(45) Date of Patent: Nov. 27, 2007

(54) MICRO MIRROR AND METHOD FOR FABRICATING THE SAME

(75) Inventors: Young-chul Ko, Suwon-si (KR); Jin-ho Lee, Suwon-si (KR); Jin-woo Cho, Seongnam-si (JP)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/668,713

(22) Filed: Jan. 30, 2007

(65) Prior Publication Data

US 2007/0121188 A1    May 31, 2007

Related U.S. Application Data

(62) Division of application No. 11/000,004, filed on Dec. 1, 2004, now Pat. No. 7,185,994.

(30) Foreign Application Priority Data

Dec. 2, 2003    (KR)    ............... 2003-86624

(51) Int. Cl.
  *G02B 26/00*    (2006.01)
  *G02B 26/08*    (2006.01)
  *H01L 29/00*    (2006.01)
  *H02N 1/00*    (2006.01)
  *C23F 1/00*    (2006.01)

(52) U.S. Cl. ............... 359/291; 359/295; 359/298; 359/214; 359/224; 359/872; 257/414; 257/415; 310/309; 345/84; 216/2; 235/454

(58) Field of Classification Search ........ 359/290–293, 359/295, 298, 245, 214, 223, 224, 871, 872, 359/877; 345/84; 310/36, 309; 235/454, 235/462.36; 257/414, 415, 417; 216/2, 216/11, 24, 33, 36, 40, 41
See application file for complete search history.

(56) References Cited

U.S. PATENT DOCUMENTS 6,769,616 B2 *  8/2004  Fu et al. ............... 235/454
6,817,725 B2   11/2004  Mizuno et al.

(Continued)

FOREIGN PATENT DOCUMENTS

JP       4-343318 A    11/1992
JP    2003-172897 A     6/2003

OTHER PUBLICATIONS

Krishanmoorthy U et al., "Dual-Mode Micromirrors for Optical Phased Array Applications", Transducers '01 Eurosensors XV. 11th International Conference on Solid-State Sensors and Actuators. Digest of Technical Papers. Munich, Jun. 10-14, 2001, International Conference on Solid State Sensors and Actuators. Digest of Technical Papers Ber, vol. 2, Jun. 10, 2001, pp. 1294-1297, XP001154517.

*Primary Examiner*—Loha Ben
(74) *Attorney, Agent, or Firm*—Sughrue Mion, PLLC (57) ABSTRACT

Disclosed is a micro mirror having a structure improved to have an increased driving angle while being driven in high speed. The micro mirror comprises a rotatable mirror section that reflects light, a pair of spring sections for supporting the mirror section and serving as a rotational axis for the mirror section when the mirror section is rotationally driven, an oval adjoining section for connecting the mirror section and the pair of spring sections, and a driving section comprising mobile combs arranged on the adjoining section, and a fixed comb provided above and/or below the mobile combs to correspond to the mobile combs to generate electrostatic force. According to the present invention, by existence of the oval adjoining section, moment can be increased without increasing rotational inertia moment so largely. Therefore, a high-speed optical scanner with an increased driving angle can be provided, which is required for a high-resolution laser TV.

13 Claims, 10 Drawing Sheets

U.S. PATENT DOCUMENTS

| | | |
|---|---|---|
| 6,914,711 B2 | 7/2005 | Novotny et al. |
| 6,985,279 B1 * | 1/2006 | Fu .............................. 359/291 |
| 7,014,115 B2 | 3/2006 | Fu |
| 7,034,370 B2 * | 4/2006 | Kuo ............................ 257/414 |
| 7,187,100 B2 * | 3/2007 | Fu .............................. 310/309 |
| 2003/0019832 A1 | 1/2003 | Conant et al. |

* cited by examiner

MICRO MIRROR AND METHOD FOR FABRICATING THE SAME

CROSS-REFERENCE TO RELATED APPLICATIONS

This is a divisional of U.S. application Ser. No. 11/000, 004, filed Dec. 1, 2004, now U.S. Pat. No. 7,185,994, which is incorporated herein by reference in its entirety. This application claims the benefit of Korean Application No. 2003-86624, filed Dec. 2, 2003 in the Korean Intellectual Property Office, the disclosure of which is incorporated herein by reference.

BACKGROUND OF THE INVENTION

1. Field of the Invention

The present invention relates to a micro mirror, and in particular, to a micro mirror capable of being used as an optical scanner for scanning laser beams in a display device such as a laser TV, and a method for fabricating the same.

2. Description of the Related Art

As the age of multimedia has arrived, demand for large-display is increased and various types of large-display devices are successively introduced. A laser TV is proposed as a display device for next generation that can implement high-resolution at a low price and large size.

Such a laser TV includes an optical scanner that scans laser beams projected from a laser diode module in horizontal and vertical directions according to RGB image signals. The optical scanner includes a micro mirror fabricated on the basis of Micro-Electro Mechanical System (MEMS).

Figure 1A:
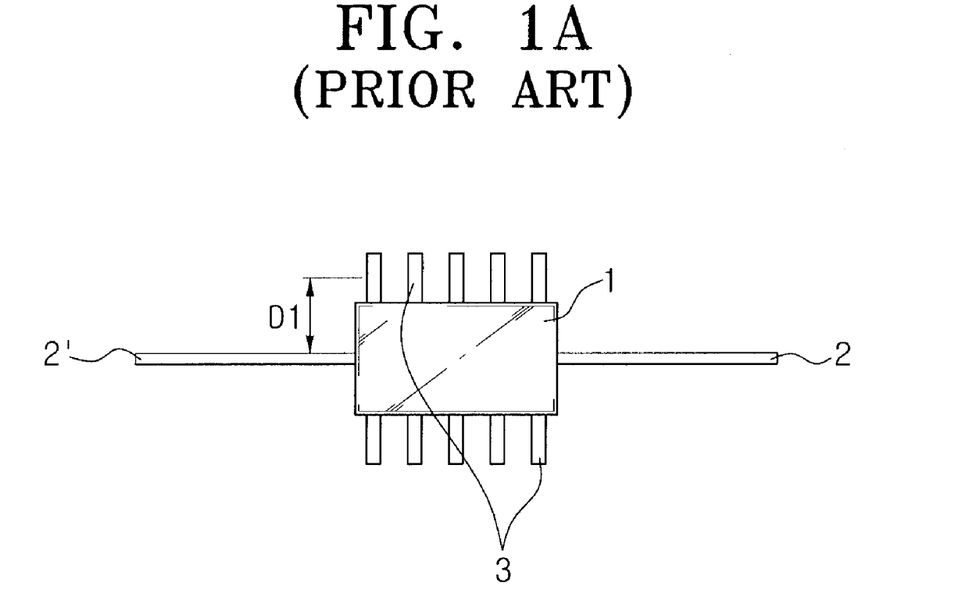
FIGS. 1A and 1B are top plan views schematically showing the structure of a conventional micro mirror.
Figure 1B:
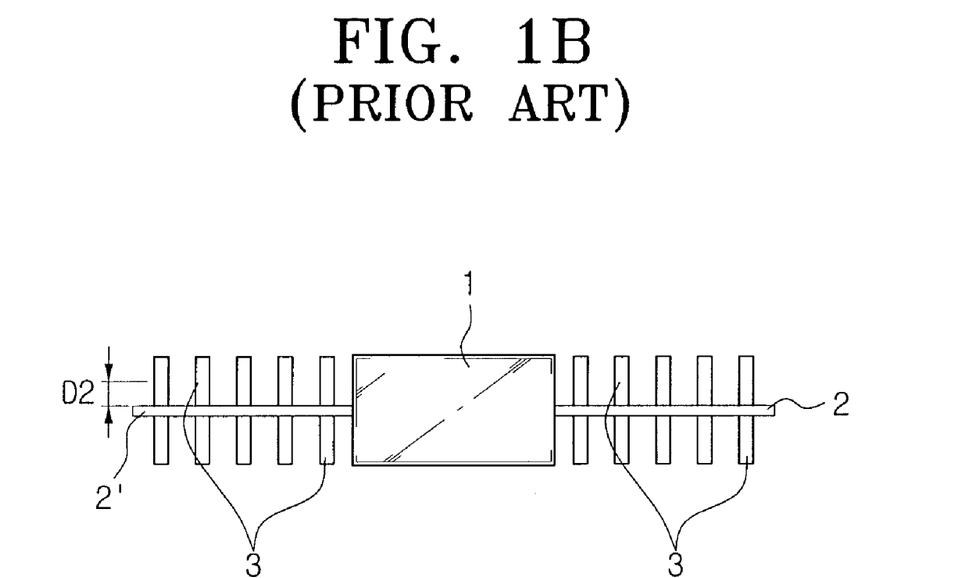
Figure 2:
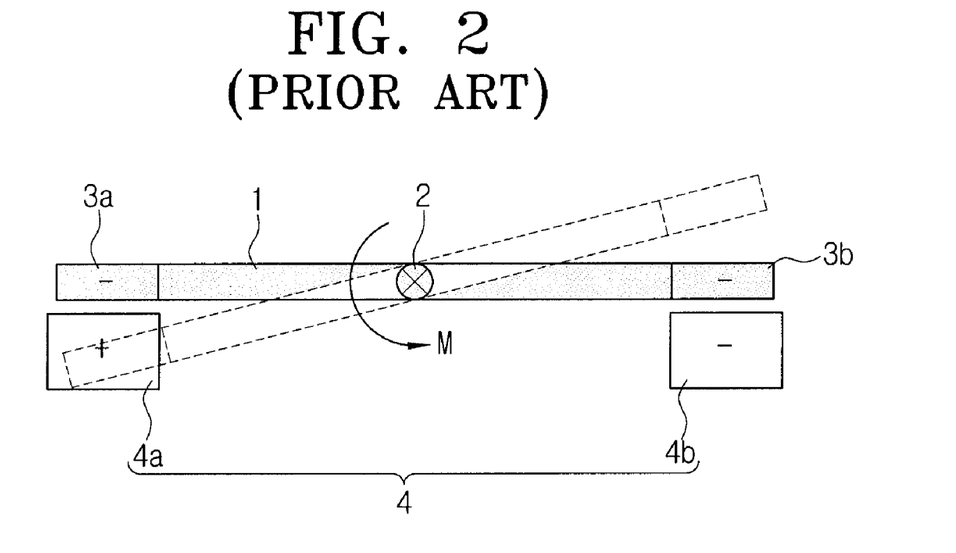
FIG. 2 is a view for illustrating the operation of the micro mirrors shown in FIG. 1.

FIGS. 1A and 1B schematically illustrate different types of micro mirrors publicly known in the prior art, and FIG. 2 is a drawing for describing the operations of these micro mirrors.

As can be seen from the drawings, a micro mirror comprises a rotatable mirror section 1, a pair of spring sections 2 and 2' connected to the mirror section 1 to support the mirror section 1 and to serve as a rotation axis when the mirror section 1 rotates, a mobile comb 3, and a fixed comb 4.

The mobile comb 3 and the fixed comb 4 have a plurality of comb-fingers 3a, 3b, . . . ; 4a, 4b, . . . , respectively. The mobile comb 3 may be installed either on the mirror section 1 as shown in FIG. 1A or on the spring sections 2 and 2' as shown in FIG. 1B. The fixed comb 4 may be installed above or below the mobile comb 3, as shown in FIG. 2, wherein they are arranged in such a manner that the comb-fingers 3a, 3b, . . . of the mobile comb 3 and the comb-fingers 4a, 4b, . . . of the fixed comb 4 are clasped each other.

Therefore, if plus (+) voltage is applied to one side comb-fingers 4a among the comb-fingers 4a, 4b of the fixed comb 4 corresponding to the comb-fingers 3a, 3b of the mobile comb 3 electrified to minus (−), electrostatic force is generated between the comb-fingers 3a and 4a, and accordingly, the mirror section 1 is rotationally driven about the spring sections 2 and 2', as indicated by dotted lines in FIG. 2. Whereas, if plus (+) voltage is applied to the other side comb-fingers 4b, the mirror section 1 is rotationally driven in the reverse direction. Due to this rotational driving of the mirror section 1, incident light is scanned to a scanning surface while being continuously and uniformly reflected to a predetermined angle range.

The driving velocity of the micro mirror is related to resolution of a display device, and the driving angle is related to a picture screen size of such a display device. That is, as the driving velocity of the micro mirror is increased, the resolution is also increased, and as the driving angle is increased, the picture screen is also increased. Therefore, in order to implement a large high-resolution laser TV, an optical scanner such as a micro mirror is required which has an increased driving angle while being driven in high velocity.

However, since driving velocity and driving angle of a micro mirror conflict each other, there is difficulty in increasing driving angle of a micro mirror and the driving velocity thereof at the same time. Resonance driving may be used in order to increase a driving angle of a micro mirror. However, this has a problem in that the yield of production is very low since it is very difficult to match the natural frequency of a micro mirror with a driving frequency due to an error in fabrication, and thus a tuning structure is required for tuning the driving frequency.

In a conventional micro mirror as shown in FIG. 1A, the mobile comb 3 is arranged on the opposite sides of a mirror section 1, in which case since a distance $D_1$ from the rotational center of the mirror section 1 is long, a moment is increased as compared to the case in which the comb fingers of the mobile combs 3 are arranged on the spring sections 2 and 2' as shown in FIG. 1B, if the same number of comb-fingers are employed. However, in this case, the number of mobile comb 3 is limited, and in addition, the size of mirror section 1 is increased in order to provide an increased number of comb-fingers of mobile comb 3, the inertia moment will be increased, and thus the natural frequency of the mirror will be lowered. Accordingly, driving velocity can not be increased.

Meanwhile, in a micro mirror as shown in FIG. 1B, the mobile combs 3 are arranged on spring sections 2 and 2', in which case it is possible to reduce the magnitude of rotational inertia moment while increasing the number of mobile combs 3, as compared to the mirror having the structure shown in FIG. 1A. However, it is impossible to obtain a sufficient driving angle since the distance $D_2$ from the central axis of the mirror section is short, thereby generating low moment. In addition, this case has a problem in that the rigidity of the spring sections 2 and 2' is not uniform due to a process error or the like.

Thus, the conventional micro mirrors as described above is hard to satisfy high driving velocity and an increased driving angle due to their constructions. Therefore, the conventional micro mirrors are not suitable for an optical scanner for a large high-resolution laser TV.

SUMMARY OF THE INVENTION

Accordingly, the present invention has been conceived to solve the above-mentioned problems occurring in the prior art, and an aspect of the present invention is to provide an improved micro mirror to increase moment while reducing rotational inertia moment so that the micro mirror can be used as a high-speed optical scanner having an increased driving angle, and a method for fabricating the same.

In order to achieve the above aspect, there is provided a micro mirror comprising a rotatable mirror section that reflects light, a pair of spring sections for supporting the mirror section and serving as a rotational axis for the mirror section when the mirror section is rotated, an adjoining section for connecting the mirror section and the pair of spring sections, and a driving section comprising a mobile comb mounted in the adjoining section and a fixed comb disposed corresponding to the mobile comb to generate electrostatic force.

The mirror section is formed in a circular shape for reflecting light with a minimum area, however, the shape is not limited so.

The adjoining section is formed in an oval shape because more mobile combs can be provided thereon and the oval shape is advantageous in view of rotational inertia moment. However, the shape is not limited so.

According to an embodiment of the present invention, the micro mirror is positioned in such a manner that its minor axis portion is circumscribed to the circumference of the circular mirror section.

The pair of spring sections perform torsional motion when the mirror section is rotated.

The mobile comb and the fixed comb of the driving section are provided with a plurality of comb-fingers, respectively, and these fingers are correspondingly arranged to clasp one another.

The fingers of the mobile comb may be arranged on the outer periphery of the adjoining section, or on both of the inner and outer peripheries of the adjoining section.

Further, the fingers of the mobile comb may be arranged on the inner and/or outer periphery and on both sides of the pair of spring sections.

In addition, the fixed comb may be arranged both above and below the mobile comb. If the fixed comb is arranged both above and below the mobile comb, the driving angle of the mirror section can be further increased because more increased electrostatic force can be applied between the one mobile comb and fixed comb.

According to another aspect of the present invention, there is provided a micro mirror comprising a rotatable mirror section that reflects light; a pair of spring sections for supporting the mirror section and serving as a rotational axis for the mirror section when the mirror section is rotationally driven; a first adjoining section for connecting the mirror section and the pair of spring sections, wherein the first adjoining section is arranged to be circumscribed to the circumference of the mirror section in one diametrical direction and connected to the pair of spring sections in another diametrical direction; a second adjoining section connected to a connection portion between the pair of spring sections of the first adjoining section with one end, and connected to the mirror section at the portion opposed to the connection portion with the other end; and a driving section comprising a mobile comb arranged on the first adjoining section, and a fixed comb provided above or below the mobile combs to correspond to the mobile combs to generate electrostatic force.

It is preferable but not limited to form the mirror section in a circular shape, the first adjoining section in an oval shape, and each second adjoining section in a straight-line shape.

The fingers of the mobile comb may be arranged on the periphery of the first adjoining section, on both of the inner and outer peripheries of the first adjoining section, or on the opposite sides of the pair of the second adjoining sections. In addition, fingers of the fixed comb may be additionally arranged on the opposite sides of the pair of the spring sections.

Further, the fixed comb may be arranged both above and below the mobile comb.

In order to achieve the afore-mentioned aspect of the present invention, there is also provided a method for fabricating a micro mirror comprising steps of forming a first metal electrode on a first glass, b) forming a first fixed comb on a first wafer through a predetermined process, c) bonding the first glass and the first wafer, and polishing the first wafer to a mirror thickness, d) forming a mirror section, a spring section, an adjoining section and a mobile comb in the first wafer polished to the mirror thickness, through a predetermined process, e) bonding a second glass patterned to form a second metal electrode and a second wafer patterned to form a second fixed comb, and polishing the second wafer to a comb thickness after bonding the second glass and the second wafer, f) forming the second metal electrode on the second glass through the patterning of the second glass, g) forming the second fixed comb on the second wafer polished to a comb thickness through a predetermined process, and h) assembling a subassembly of step d) and a subassembly of step g) by bonding, and then bonding first and second wires for applying driving voltage to the first and second metal electrodes.

Step a) comprises steps of providing a Pyrex glass having a predetermined thickness, forming a line hole for the first metal electrode on the glass by etching, coating a metal layer to a predetermined thickness on the surface of the glass having the line hole, and removing the metal layer by etching except the metal layer above the line hole.

Step b) comprises steps of providing a highly doped SOI wafer having a silicone layer of a predetermined thickness, a single crystal silicon layer and a $SiO_2$ layer interposed between the silicon layers, and forming a plurality of comb-fingers of the first fixed comb in the single crystal silicon layer through a photolithography process.

In addition, step d) comprises step of forming an Au reflection part for reflecting light on the surface of the mirror section, wherein the mirror section, spring sections, adjoining section, and mobile sections are formed by a photolithography process.

BRIEF DESCRIPTION OF THE DRAWINGS

The above and other aspects, features and advantages of the present invention will be more apparent from the following detailed description taken with reference to the accompanying drawings, in which:

FIG. 4 is schematic views for illustrating the operation of the micro mirror according to the first embodiment as shown in FIG. 3, in which

DETAILED DESCRIPTION OF EXEMPLARY EMBODIMENTS

Figure 3:
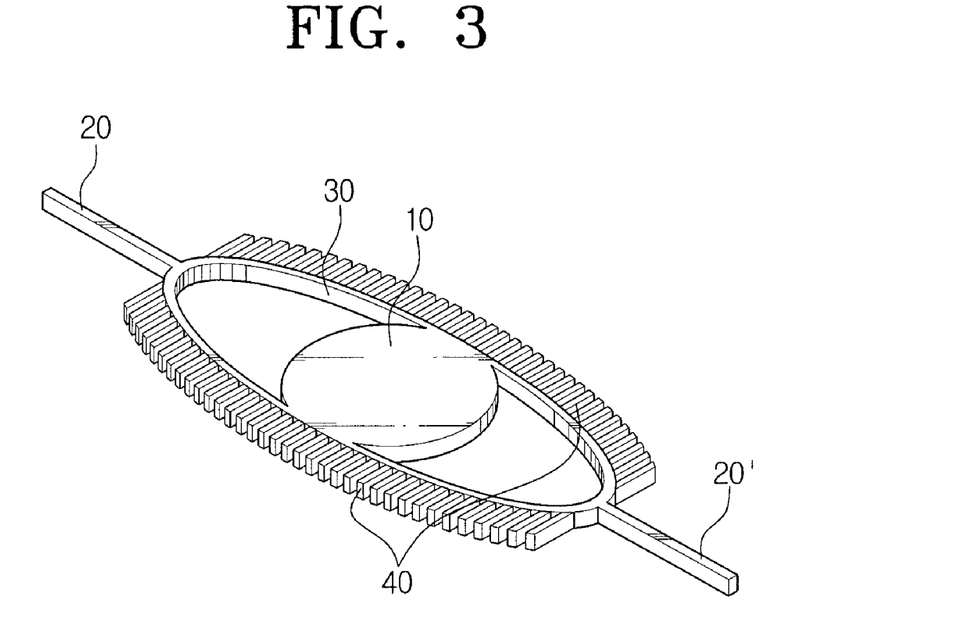
FIG. 3 is a perspective view schematically showing the structure of a micro mirror according to a first embodiment of the present invention.
Figure 4A:
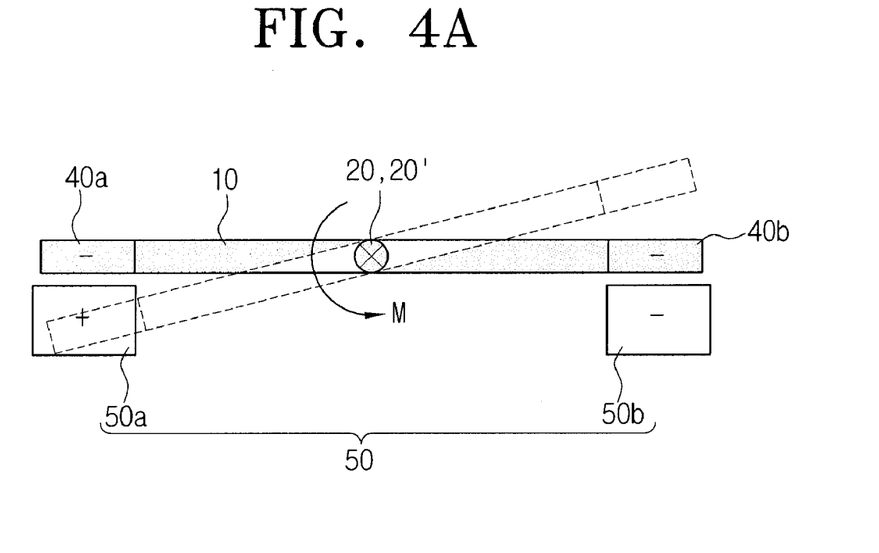
FIG. 4A shows an application of a fixed comb provided below a mobile comb.
Figure 4B:
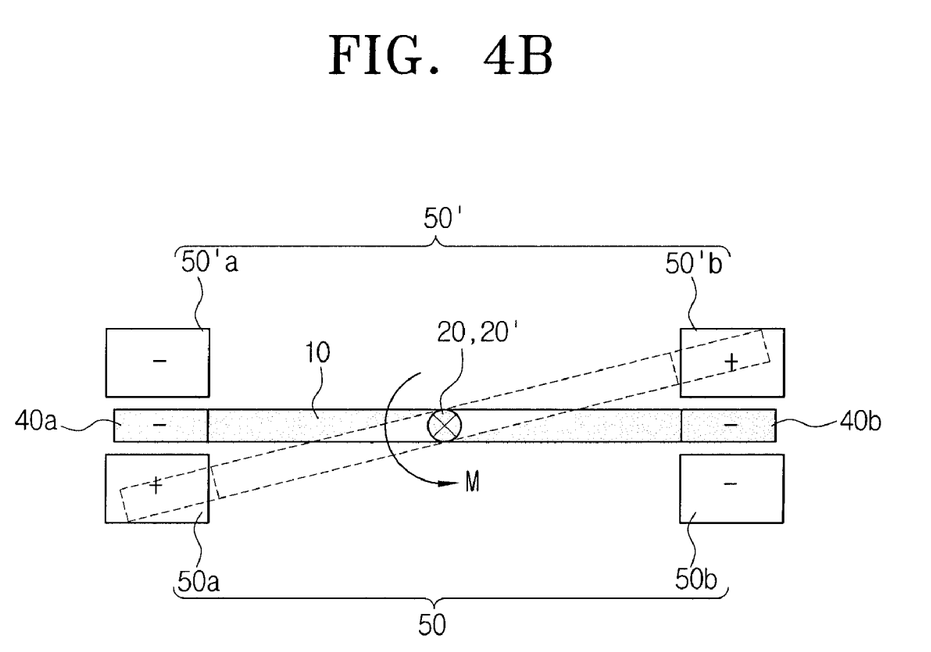
FIG. 4B shows an application of two fixed combs provided above and below a mobile comb.

As shown in FIGS. 3, 4A and 4B, a mirror section 10 for reflecting light in a micro mirror according to a first embodiment of the present invention is formed in a circular shape having a minimum area for reflecting light. Although the mirror section 10 is not limited to a circular shape, the circular shape does not increase rotational inertia moment so largely. The radius of the mirror section 10 can be properly adjusted depending on a radius of light to be used.

Such a mirror is rotationally driven within a predetermined angular range about a pair of spring sections 20 and 20'. The pair of springs 20 and 20' support the mirror section and perform torsion motion when the mirror section 10 is rotationally driven.

An adjoining section 30 connects the mirror section 10 and the pair of spring sections 20 and 20'. The adjoining section 30 is formed in an oval shape, and the mirror section 10 is positioned within the adjoining section 30. The minor axis portions on the inner periphery of the oval adjoining section 30 and the corresponding parts on the outer periphery of the mirror section 10 are connected with each other. The major axis portions of the adjoining section 30 are connected to the pair of spring sections 20 and 20', respectively. With this arrangement of the mirror section 10 and the adjoining section 30, predetermined spaces are provided within the oval adjoining section 30, that is, between the inner periphery portion of the adjoining section 30 extended from the minor axis to the major axis thereof and the non-circumscribed outer periphery portion of the mirror section 10.

The shape of the adjoining section 30 is not limited to an oval shape. However, the oval shape allows more comb-fingers to be installed on the adjoining section 30 and does not increase rotational inertia moment so largely so that the driving angle of the micro mirror can be maximized.

A mobile comb 40 comprises a plurality of comb-fingers 40a, 40b, and the comb-fingers 40a, 40b are equi-spaced around the circumstance of the oval adjoining section 30. Compared to a conventional structure, in the present embodiment, the area of the mirror section or the like affecting rotational inertia moment is rather reduced while allowing more comb-fingers to be arranged on the mobile comb 40 as compared to the conventional one.

Fixed comb 50 is also provided with a plurality of comb-fingers 50a, 50b, respectively, in which the comb-fingers 50a, 50b are arranged below the mobile comb 40 as can be seen from FIG. 4A. At this time, the comb fingers 40a, 40b of the mobile comb 40 and the comb fingers 50a, 50b of the fixed comb 50 are arranged to be clasped one another. Alternatively, the fixed comb 50 may be disposed above the mobile comb 40.

As shown in FIG. 4B, it is possible to provide an embodiment in which a first fixed comb 50 is arranged below the mobile comb 40, and second fixed comb 50' is arranged above the mobile comb 40.

In the mirrors as described above, electrostatic force is applied to the mobile comb 40 arranged on the adjoining section by the fixed comb 50 installed to be engaged with the mobile comb 40, as shown in FIG. 4A. The electrostatic force induces rotational force, in which the spring sections 20 and 20' of the mirror section 10 serve as a center axis for the rotational force. Accordingly, the mirror section 10 rotates about the spring sections 20 and 20', and if the voltage of the fixed comb 50 is applied in a constant driving frequency, the mirror section 10 will be repeatedly rotated with the driving frequency.

The micro mirror as shown in FIG. 4B has first and second fixed combs 50, 50' arranged above and below the mobile comb 40, respectively. In this case, since the electrostatic force between the mobile comb 40 and the fixed combs 50, 50' is doubled as compared to the case shown in FIG. 4A, a more increased driving angle of the mirror can be obtained. In addition, since the electrostatic force is equally applied to the mirror section 10 in up and down directions, the mirror section can be smoothly driven without being vibrated up and down.

As described above, a micro mirror construction proposed by the present invention has an increased driving angle and high natural frequency as compared to the conventional micro mirror. Therefore, the inventive micro mirror can accomplish an increased driving angle while being driven in high velocity, the principle of which will be described using a following equation.

If any attenuation component is disregarded, motion of a rotating body may be expressed by the following equation:

$$J\ddot{\theta} + k\theta = M$$

wherein J is a rotational inertia moment, k is a torsional spring constant, and M is an applied torque.

The natural frequency for the rotational motion of this system is expressed as follows:

$$f = \frac{1}{2\pi}\sqrt{\frac{k}{J}}$$

According to the above equations, with micro mirrors designed to have the same natural frequency, if the rotational inertia moment J is reduced, the torsional spring constant k can be reduced, and therefore, the driving angle can be increased even with small force.

As a result of analyzing a conventional construction and an inventive construction using an ANSYS program for computer simulation, when the two constructions are driven with the same driving frequency (33.75 KHz) after designing the constructions each to have a natural frequency of 40 KHz, the driving angle of the conventional one is 2.3 degrees while that of the inventive one is 4.0 degrees.

Figure 5:
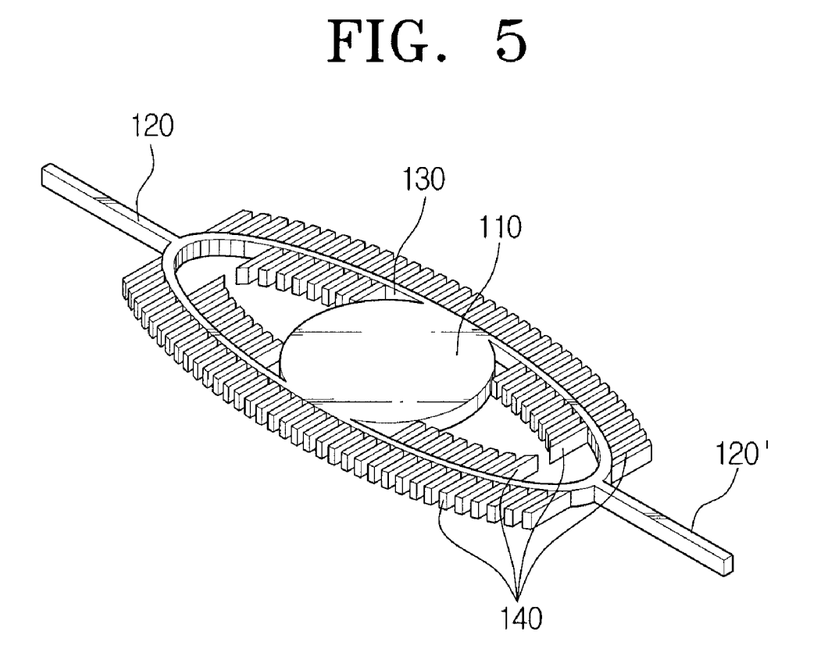
FIG. 5 is a perspective view schematically showing a construction of a micro mirror according to a second embodiment of the present invention.

FIG. 5 shows a micro mirror according to a second embodiment of the present invention.

As shown in the drawing, the basic construction of the micro mirror according to the second embodiment is the same as that of the first embodiment described above. Therefore, the similar parts are indicated by similar reference numerals. However, detailed description thereof is omitted, and only the characteristic construction of this embodiment is described. Other various embodiments will be shown and described later in this manner.

As shown in FIG. 5, in the present embodiment, the mobile combs 140 are arranged on the inner periphery as well as on the outer periphery of the oval adjoining section 130. Although not shown in specific, the fixed combs are provided to correspond to the mobile combs 140. In addition, the fixed combs may be arranged above and/or below the mobile combs.

Figure 6:
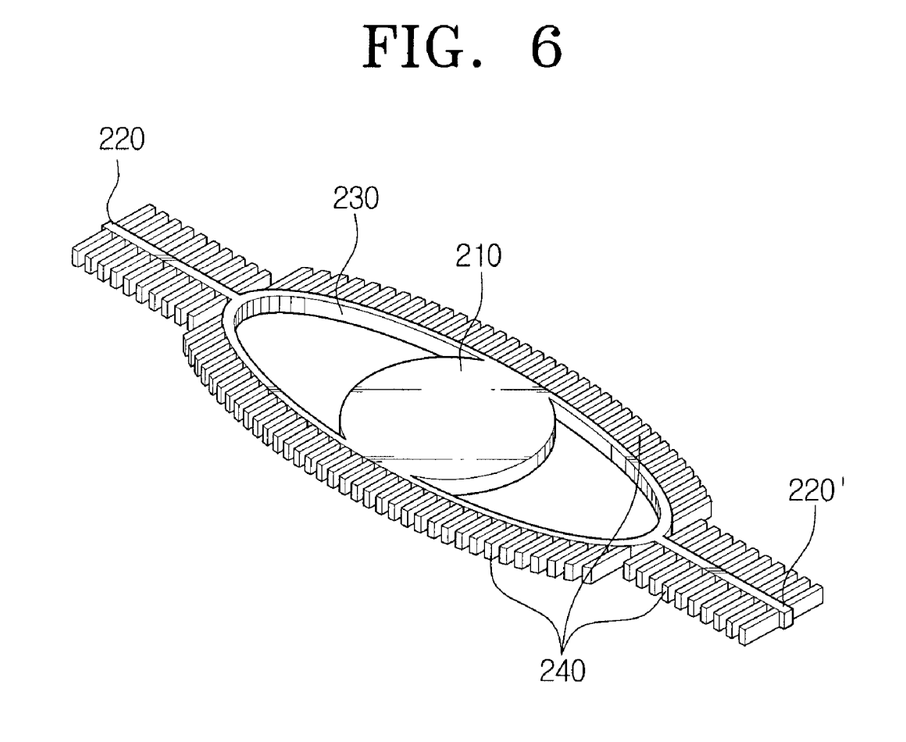
FIG. 6 is a perspective view schematically showing a construction of a micro mirror according to a third embodiment of the present invention.

In a micro mirror according to a third embodiment of the present invention as shown in FIG. 6, mobile combs 240 are provided on the outer periphery of an oval adjoining section 230 and on opposite sides of spring sections 220 and 220'. In addition, although not shown in the drawing, mobile combs may be additionally provided on the inner periphery of the adjoining section 230.

Figure 7:
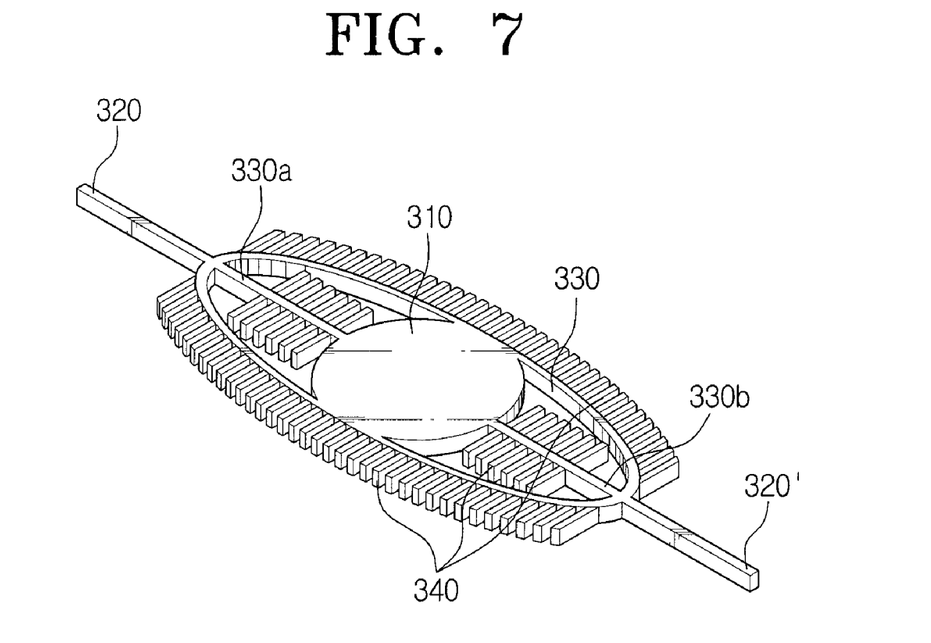
FIG. 7 is a perspective view schematically showing a construction of a micro mirror according to a fourth embodiment of the present invention.

FIG. 7 shows a micro mirror according to a fourth embodiment of the present invention. As shown in FIG. 7, the fourth embodiment of the present invention comprises a circular mirror section 310, a pair of spring sections 320 and 320', a first adjoining section 330 of an oval shape, a pair of second adjoining sections 330a and 330b of straight line shape extended from the portions where the spring sections are adjoined to the first adjoining section 330 to the mirror section 310, and mobile combs 340 and fixed combs constructing a driving section. The mobile combs 340 are arranged on the outer periphery of the first adjoining section 330 and on the opposite sides of each second adjoining section 330a and 330b.

Figure 8:
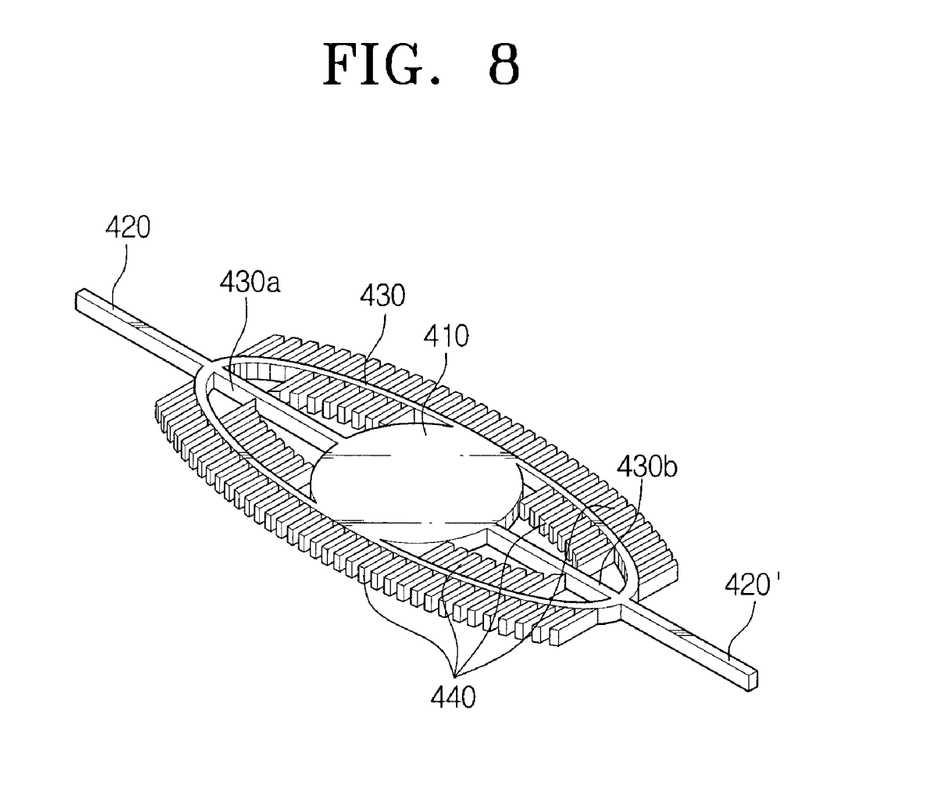
FIG. 8 is a perspective view schematically showing a construction of a micro mirror according to a fifth embodiment of the present invention.

In addition, a micro mirror according to a fifth embodiment of the present invention as shown in FIG. 8 has mobile combs 440 arranged on the inner and outer peripheries of the first adjoining section 430 unlike the fourth embodiment.

Figure 9:
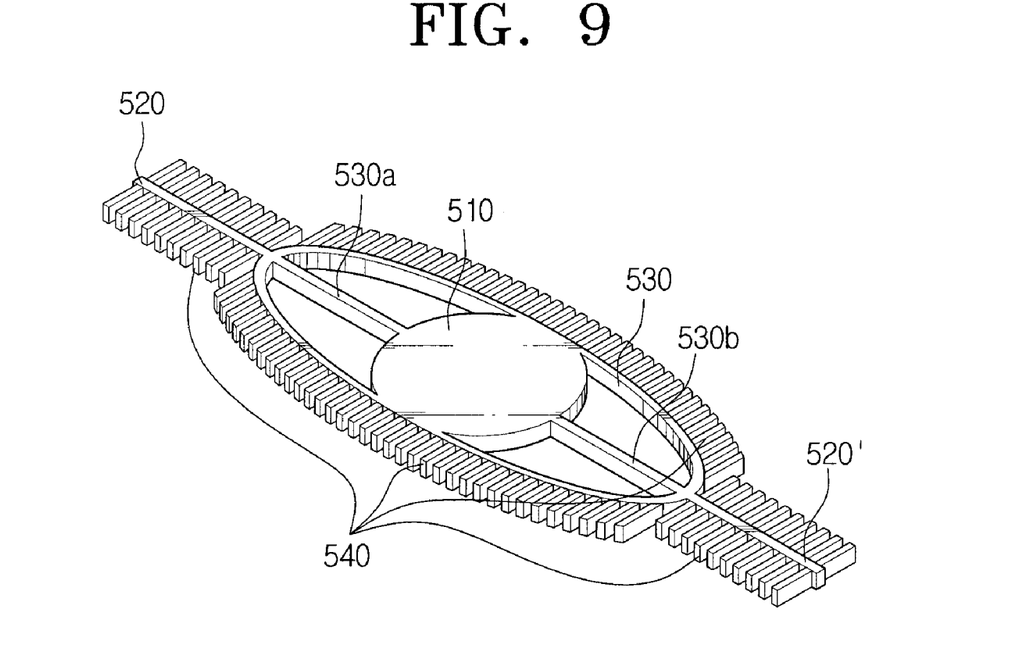
FIG. 9 is a perspective view schematically showing a construction of a micro mirror according to a sixth embodiment of the present invention.
Figure 10:
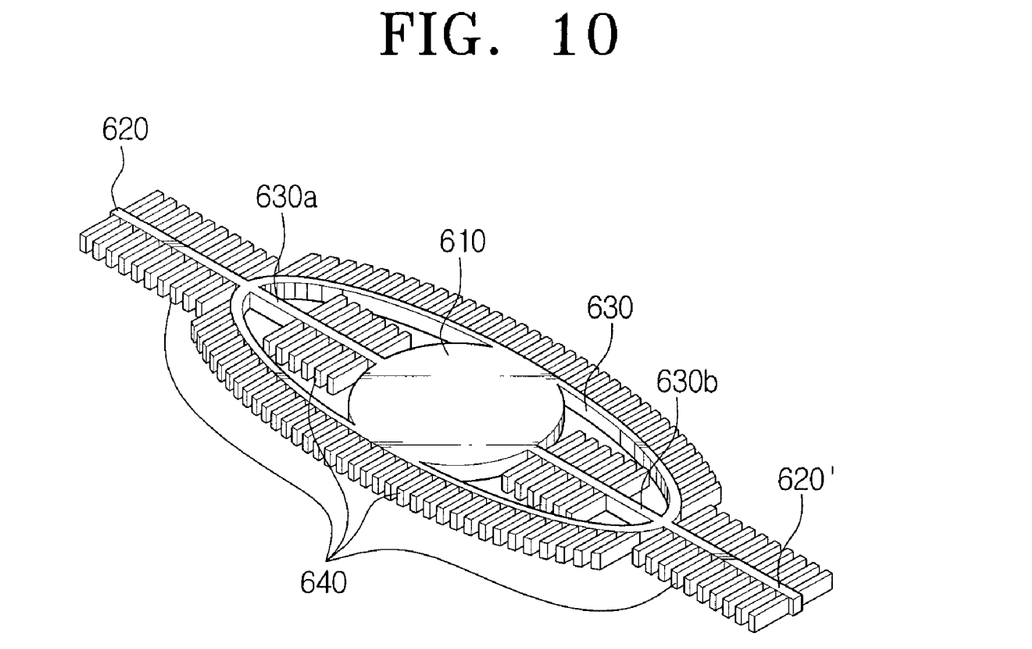
FIG. 10 is a perspective view schematically showing a construction of a micro mirror according to a seventh embodiment of the present invention.
Figure 11:
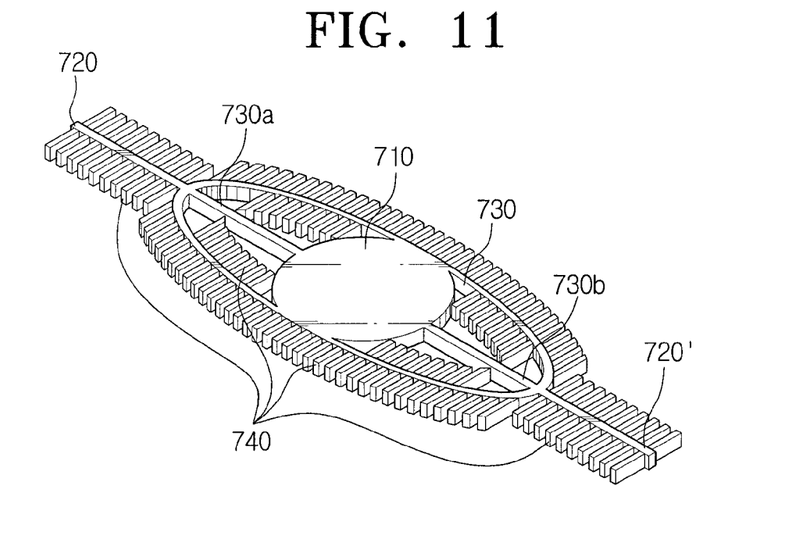
FIG. 11 is a perspective view schematically showing a construction of a micro mirror according to an eighth embodiment of the present invention.

FIGS. 9 to 11 respectively show sixth to eighth embodiments. The sixth embodiment of FIG. 9 is a micro mirror provided with mobile combs 540 on the periphery of a first adjoining section 530 and on the opposite sides of a pair of spring sections 520 and 520' thereof, respectively. The seventh embodiment of FIG. 10 is a micro mirror provided with mobile combs 640 on the outer periphery of a first adjoining section 630, on the opposite sides of a pair of spring sections 620 and 620' and on the opposite sides of each second adjoining section 630a and 630b, respectively. Additionally, the eighth embodiment of FIG. 11 is a micro mirror provided with mobile combs 740 on the inner and outer peripheries of a first adjoining section 730 and on the opposite sides of a pair of springs 720 and 720', respectively.

As can be seen from the constructions of the various embodiments above, the inventive mirrors commonly have an oval adjoining section which does not increase rotational inertia moment so largely while the area of a circular mirror section can be minimized and more mobile combs can be provided on the adjoining section. Accordingly, it is possible to implement an increased driving angle while increasing driving velocity of a micro mirror.

Hereinbelow, a method of fabricating the inventive micro mirror will be described with reference to FIGS. 12 to 14. In this embodiment, a method of fabricating a micro mirror in which first and second fixed combs are arranged above and below a mobile comb is described.

FIGS. 12A to 12F show steps of fabricating a lower structure of a micro mirror.

Figure 12A:
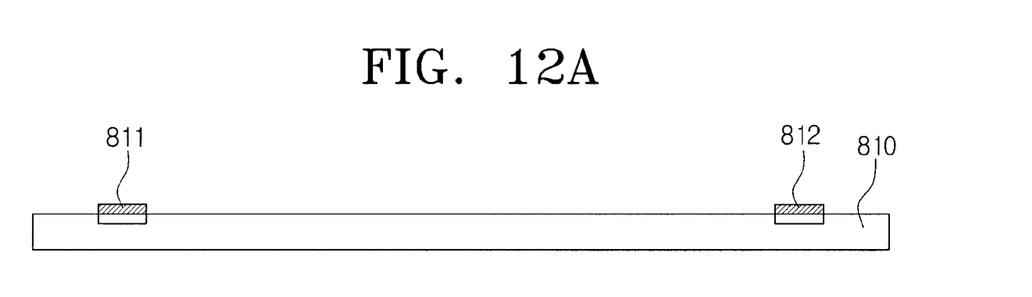
FIGS. 12A to 12F illustrate process of fabricating a lower structure of a micro mirror according to the present invention.

First, first metal electrodes 811 and 812 are formed on a first glass 810 having a predetermined thickness, as shown in FIG. 12A. A Pyrex glass may be used for the glass 810. The metal electrodes 811 and 812 may be formed through steps of etching electrode-forming areas on the first glass 810 to form line holes for the metal electrodes, coating an electrode metal layer on the entire surface of the glass 810 to a predetermined thickness, and wet-etching the electrode metal layer to leave the metal layer only on the line holes.

Figure 12B:
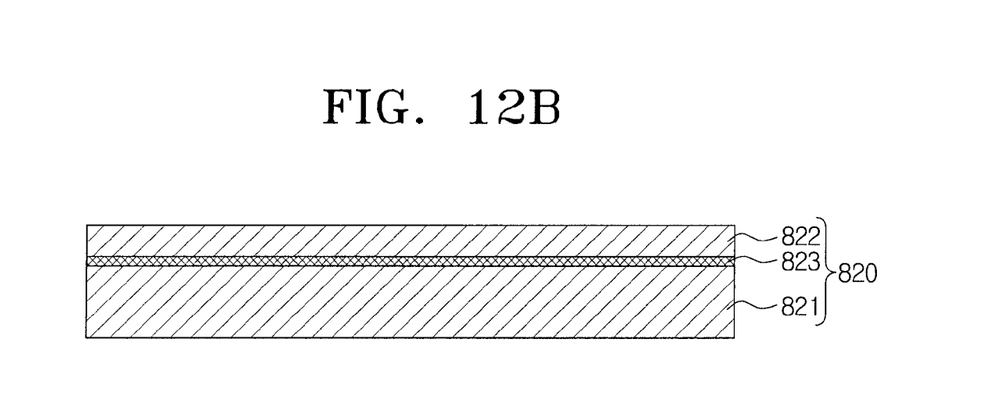

After preparing the first glass 810 having metal electrodes 811 and 812 as described above, a first wafer 820 is provided as shown in FIG. 12B. The first wafer 820 is a highly doped SOI wafer having a silicon layer 821 of a predetermined thickness, a single crystal silicon layer 822 and a $SiO_2$ layer 823 interposed between the silicon layer 821 and the SiO2 layer 823.

Figure 12C:
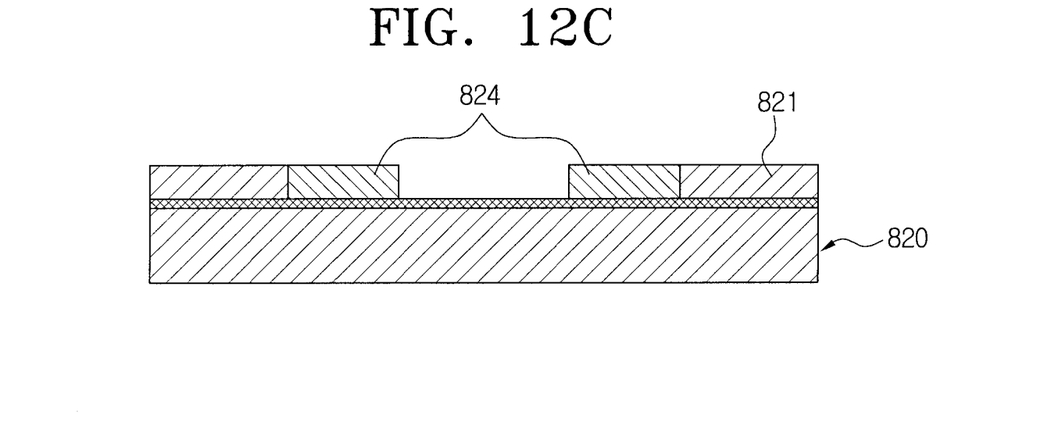

The single crystal silicon layer 822 of the first wafer 820 is formed with a plurality of comb-fingers 824 which form a first fixed comb. The plurality of comb-fingers 824 may be formed by a photolithography process, for example.

Figure 12D:
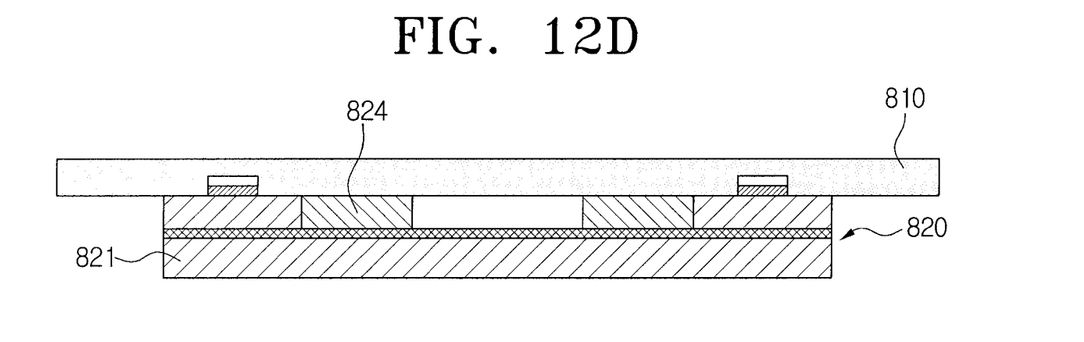

FIG. 12D shows a state in which the silicon layer 821 of the first wafer 820 is polished to a certain thickness for forming a mirror after the first glass 810 and the first wafer are bonded each other.

Figure 12E:
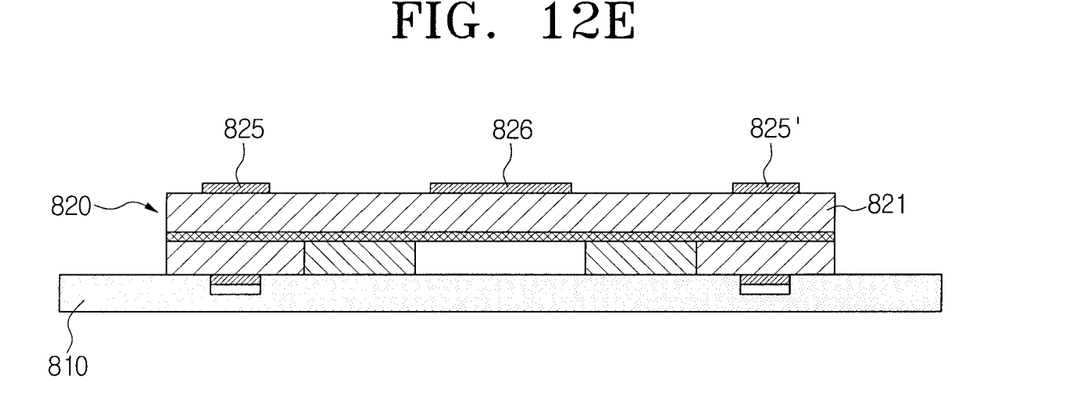

On the surface of the polished silicon layer 821 of the first wafer 820, bonding areas 825 and 825', and a reflection area 826 are formed at proper positions. Both of the bonding areas 825 and 825' and the reflection area 826 are formed from Au, by depositing Au on the silicon layer 821 to a predetermined thickness and then etching the Au layer to remove a useless area.

Figure 12F:
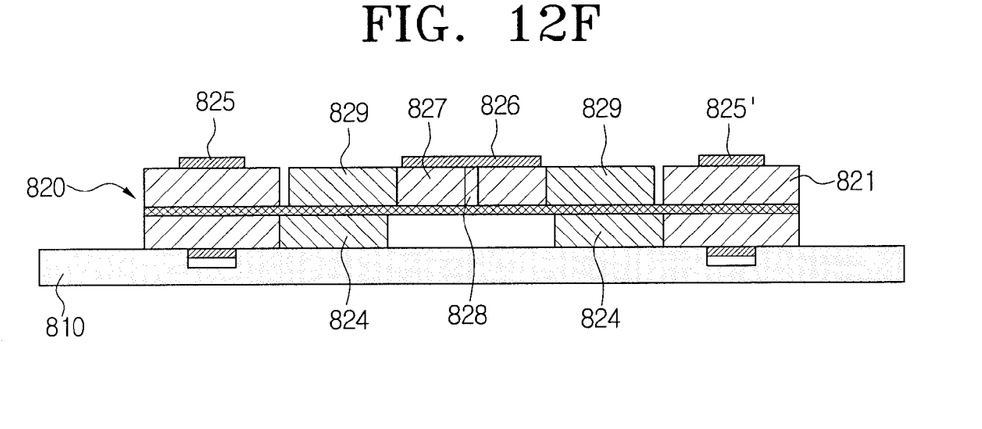

As can be seen from FIG. 12F, a mirror section 827, spring sections 828, mobile comb 829, and an adjoining section (not shown) are formed in the silicon layer 812 through a photolithography process, for example.

FIGS. 13A to 13F illustrate steps of fabricating an upper structure of a micro mirror.

Figure 13A:
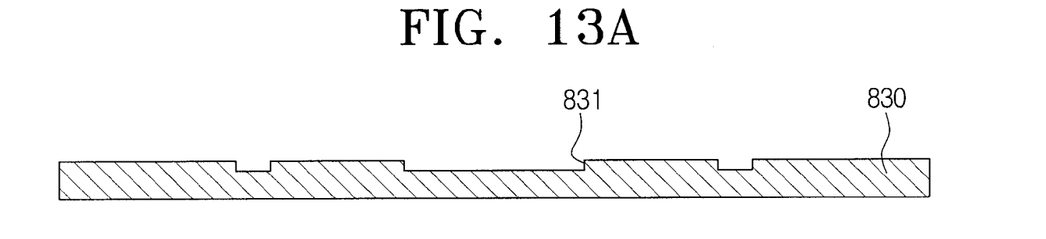
FIGS. 13A to 13F illustrate process of fabricating an upper structure of a micro mirror according to the present invention.
Figure 13B:
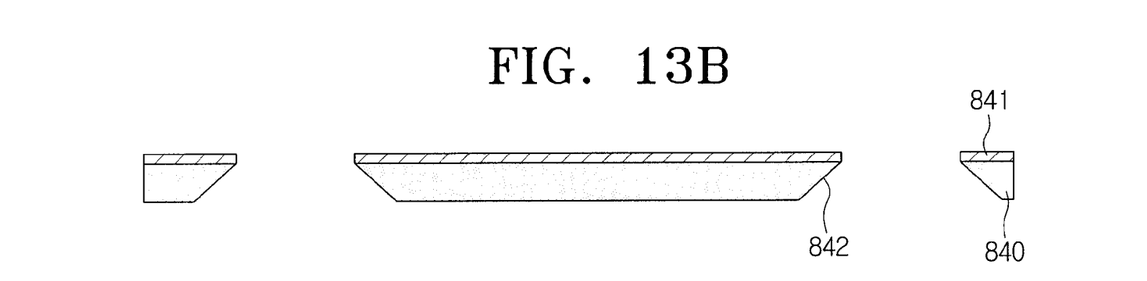

FIG. 13A and FIG. 13B show a second wafer 830 and a second glass 840, respectively. The second wafer 830 is a highly doped silicon wafer, and the second glass 840 has a DFR film 841. The second wafer 830 has a pattern section 831 for forming a second fixed comb, and the second glass 840 also has a pattern section 842 patterned to form second metal electrodes 843 and 844.

Figure 13C:
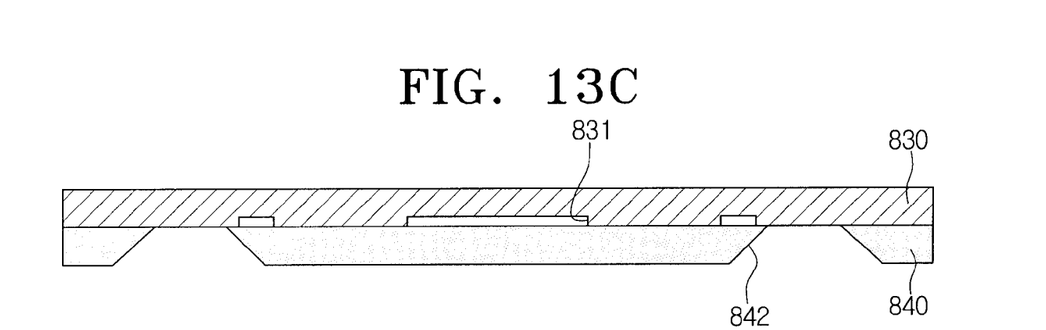
Figure 13D:
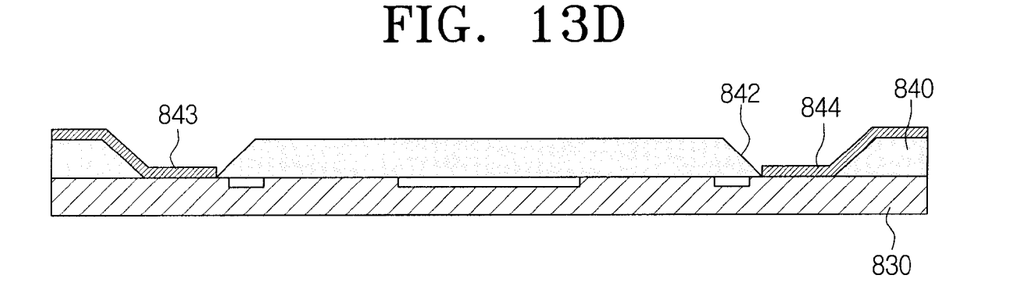

The second wafer 830 and the second glass 840 are bonded each other as shown in FIG. 13C, and then predetermined second electrodes 843 and 844 are formed through the pattern section 842 of the second glass 840, as shown in FIG. 13D. The second metal electrodes 843 and 844 are formed by patterning the electrodes using a mask after coating a metal layer.

Figure 13E:
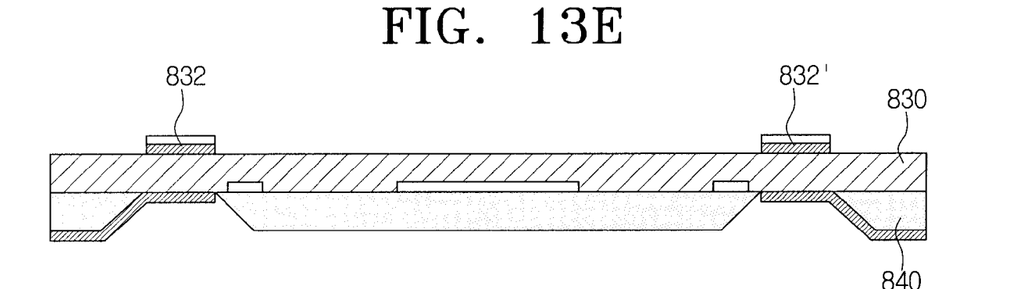

FIG. 13E shows bonding parts 832 and 832' formed on predetermined positions on the second wafer 830. The bonding parts 832 and 832' are formed by depositing Au on the surface of the second wafer, plating AuSn and then removing useless deposited layer and plated layer.

Figure 13F:
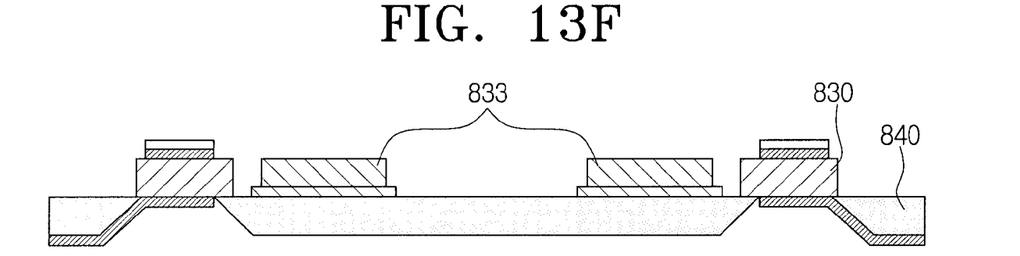

Then, a plurality of comb-fingers 833 forming a second fixed comb are formed on the second wafer 830 as shown in FIG. 13F through a photolithography process, for example.

Figure 14:
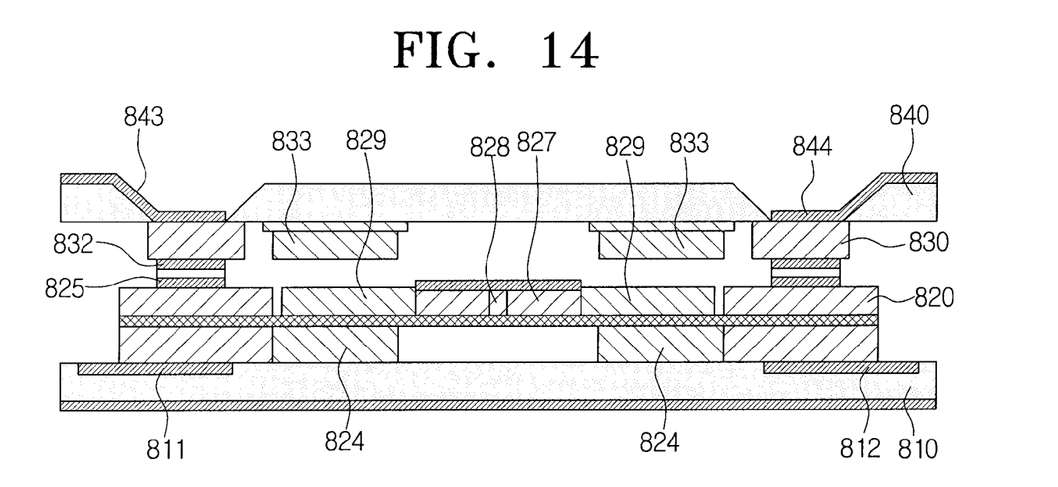
FIG. 14 shows the lower structure and the upper structure fabricated according to the processes as shown in FIGS. 12 and 13, respectively, in an assembled state.

The lower structure and the upper structure each fabricated through the processes as described above are assembled by using bonding parts 825, 825', 832 and 832' formed on the respective structures, as shown in FIG. 14.

Finally, first and second wires (not shown) are bonded to apply driving voltage to the first and second metal electrodes 811 and 812, 843, 844 of the first and second glasses 810 and 840 in the structure assembled as described above.

As described above, according to the present invention, a micro mirror is implemented, which is capable of increasing moment without increasing rotational inertia moment so largely. Accordingly, a high-speed optical scanner with an increased driving angle can be provided such that it will be possible to accelerate development of next generation display devices such as a laser TV and marketing of products thereof.

While the embodiments of the present invention have been shown and described with reference to the embodiments thereof in order to exemplify the principle of the present invention, the present invention is not limited to the embodiments. It will be understood that various modifications and changes can be made by those skilled in the art without departing from the spirit and scope of the invention as defined by the appended claims. Therefore, it shall be considered that such modifications, changes and equivalents thereof are all included within the scope of the present invention.

What is claimed is:

1. A micro mirror comprising:
a rotatable mirror section that reflects light;
a pair of spring sections for supporting the mirror section and serving as a rotational axis for the mirror section when the mirror section is rotationally driven;
a first adjoining section for connecting the mirror section and the pair of spring sections, wherein the first adjoining section is arranged to be circumscribed to the circumference of the mirror section in one diametrical direction and connected to the pair of spring sections in another diametrical direction;
a second adjoining section connected to a connection portion between the pair of spring sections and the first adjoining section with one end, and connected to the mirror section at the portion opposed to the connection portion with the other end; and
a driving section comprising a mobile comb arranged on the first adjoining section, and a fixed comb provided above or below the mobile comb to correspond to the mobile comb to generate electrostatic force.

2. The micro mirror according to claim 1, wherein the mirror section is formed in a circular shape, the first adjoining section is formed in an oval shape, and the second adjoining section is formed in a straight-line shape.

3. The micro mirror according to claim 2, wherein the fingers of the mobile comb are arranged on the outer periphery of the first adjoining section.

4. The micro mirror according to claim 2, wherein the fingers of the mobile comb are arranged on both the inner and outer peripheries of the first adjoining section.

5. The micro mirror according to claim 2, wherein the fingers of the mobile comb are arranged on the periphery of the first adjoining section and on the opposite sides of the second adjoining section.

6. The micro mirror according to claim 2, wherein the fixed comb is arranged both above and below the mobile comb.

7. A micro mirror comprising:
a rotatable mirror section that reflects light;
a pair of spring sections for supporting the mirror section and serving as a rotational axis for the mirror section when the mirror section is rotationally driven;
a first adjoining section for connecting the mirror section and the pair of spring sections, wherein the first adjoining section is arranged to be circumscribed to the circumference of the mirror section in one diametrical direction and connected to the pair of spring sections in another diametrical direction;
a second adjoining section connected to a connection portion between the pair of spring sections and the first adjoining section with one end, and connected to the mirror section at the portion opposed to the connection portion with the other end; and
a driving section comprising a mobile comb arranged on the first and the second adjoining sections, and a fixed comb provided above and/or below the mobile combs to correspond to the mobile combs to generate electrostatic force.

8. A micro mirror comprising:
a rotatable mirror section that reflects light;
a pair of spring sections for supporting the mirror section and serving as a rotational axis for the mirror section when the mirror section is rotationally driven;
a first adjoining section for connecting the mirror section and the pair of spring sections, wherein the first adjoining section is arranged to be circumscribed to the circumference of the mirror section in one diametrical direction and connected to the pair of spring sections in another diametrical direction;
a second adjoining section connected to a connection portion between the pair of spring sections and the first adjoining section with one end, and connected to the mirror section at the portion opposed to the connection portion with the other end; and
a driving section comprising a mobile comb arranged on the first adjoining section and the pair of spring sections, and a fixed comb provided above and/or below the mobile combs to correspond to the mobile combs to generate electrostatic force.

9. A micro mirror comprising:
a rotatable mirror section that reflects light;
a pair of spring sections for supporting the mirror section and serving as a rotational axis for the mirror section when the mirror section is rotationally driven;
a first adjoining section for connecting the mirror section and the pair of spring sections, wherein the first adjoining section is arranged to be circumscribed to the circumference of the mirror section in one diametrical direction and connected to the pair of spring sections in another diametrical direction;
a second adjoining section connected to a connection portion between the pair of spring sections and the first adjoining section with one end, and connected to the mirror section at the portion opposed to the connection portion with the other end; and
a driving section comprising a mobile comb arranged on the first adjoining section, the second adjoining section and the pair of spring sections, and a fixed comb provided above and/or below the mobile combs to correspond to the mobile combs to generate electrostatic force.

10. A method for fabricating a micro mirror comprising steps of:
a) forming a first metal electrode on a first glass;
b) forming a first fixed comb on a first wafer through a predetermined process;
c) bonding the first glass and the first wafer and polishing the first wafer to a mirror thickness;
d) forming a first subassembly comprising a mirror section, a spring section, an adjoining section and a mobile comb in the first wafer polished to the mirror thickness, through a predetermined process;

e) bonding a second glass patterned to form a second metal electrode and a second wafer patterned to form a second fixed comb, and polishing the second wafer to a thickness of the second fixed comb;

f) forming the second metal electrode on the second glass through the patterning of the second glass;

g) forming a second subassembly comprising the second fixed comb on the second wafer polished to the second fixed comb thickness through a predetermined process; and h) assembling the first subassembly of step d) and the second subassembly of step g) by bonding, and then connecting first and second wires for applying driving voltage to the first and second metal electrodes.

11. The method according to claim 10, wherein step a) comprises steps of:

providing a Pyrex glass of a predetermined thickness;

forming a line hole for the first metal electrode on the glass by etching;

coating a metal layer to a predetermined thickness on the surface of the glass having the line hole; and removing the metal layer by etching except the metal layer above the line hole.

12. The method according to claim 10, wherein step b) comprises steps of:

providing a highly doped SOI wafer having a silicon layer of a predetermined thickness, a single crystal silicon layer and a $SiO_2$ layer interposed between the silicon layers; and forming a plurality of comb-fingers of the first fixed comb in the single crystal silicon layer through a photolithography process.

13. The method according to claim 10, wherein step d) comprises step of forming a reflection part for reflecting light from Au on the surface of the mirror section, wherein the mirror section, spring section, adjoining section, and mobile comb are formed by a photolithography process.

* * * * *